(12) United States Patent
Petersson et al.

(10) Patent No.: US 12,513,534 B2
(45) Date of Patent: Dec. 30, 2025

(54) TRANSMISSION OF REFERENCE SIGNAL RESOURCES AND CONFIGURATION THEREOF

(71) Applicant: Telefonaktiebolaget LM Ericsson (publ), Stockholm (SE)

(72) Inventors: Sven Petersson, Sävedalen (SE); Andreas Nilsson, Gothenburg (SE); Fredrik Athley, Kullavik (SE); Eleftherios Karipidis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 696 days.

(21) Appl. No.: 17/793,871

(22) PCT Filed: Jan. 21, 2020

(86) PCT No.: PCT/EP2020/051417
§ 371 (c)(1),
(2) Date: Jul. 19, 2022

(87) PCT Pub. No.: WO2021/148109
PCT Pub. Date: Jul. 29, 2021

(65) Prior Publication Data
US 2023/0049502 A1   Feb. 16, 2023

(51) Int. Cl.
*H04W 16/28*  (2009.01)
*H04B 7/06*  (2006.01)
(Continued)

(52) U.S. Cl.
CPC ........ *H04W 16/28* (2013.01); *H04B 7/06956* (2023.05); *H04L 5/0051* (2013.01); *H04L 27/2605* (2013.01)

(58) Field of Classification Search
CPC .. H04B 7/0404; H04B 7/0691; H04B 7/0695; H04L 27/2605; H04L 5/0023; H04L 5/0048; H04L 5/0051; H04W 16/28
See application file for complete search history.

(56) References Cited

U.S. PATENT DOCUMENTS

2017/0215152 A1\* 7/2017 Byun ................. H04W 52/143
2018/0206132 A1\* 7/2018 Guo .................. H04W 72/0473
(Continued)

FOREIGN PATENT DOCUMENTS

WO    2019158186 A1    8/2019
WO    2020164723 A1    8/2020

OTHER PUBLICATIONS

International Search Report and the Written Opinion of the International Searching Authority, issued in corresponding International Application No. PCT/EP2020/051417, dated Nov. 5, 2020, 26 pages.
(Continued)

*Primary Examiner* — Awet Haile
(74) *Attorney, Agent, or Firm* — Rothwell, Figg, Ernst & Manbeck, P.C.

(57) ABSTRACT

There is provided mechanisms for transmission of reference signal resources from a terminal device. A method is performed by the terminal device. The terminal device comprises at least two antenna panels and a baseband chain operable to be switched between the at least two antenna panels. The baseband chain is thereby connected to each of the antenna panels one at a time. The method comprises distributing a fixed set of reference signal resources among the at least two antenna panels by selecting which beams are to be used for transmission of the reference signal resources. The reference signal resources are distributed among the at least two antenna panels according to antenna panel selection information. The method comprises transmitting each
(Continued)

of the reference signal resources in a respective one of the beams as the baseband chain is connected to each antenna panel used for generating the beams.

21 Claims, 9 Drawing Sheets

(51) Int. Cl.
    *H04L 5/00*           (2006.01)
    *H04L 27/26*         (2006.01)

(56) References Cited

U.S. PATENT DOCUMENTS

| | | |
|---|---|---|
| 2019/0068263 A1 | 2/2019 | Yu et al. |
| 2019/0081751 A1 | 3/2019 | Miao et al. |
| 2019/0297603 A1 | 9/2019 | Guo et al. |
| 2020/0029274 A1* | 1/2020 | Cheng .................. H04W 76/28 |
| 2020/0120531 A1* | 4/2020 | Qin ...................... H04B 7/0695 |
| 2020/0120604 A1* | 4/2020 | Nam .................... H04W 52/028 |
| 2021/0167821 A1* | 6/2021 | Chen .................... H04B 7/0617 |
| 2022/0123887 A1* | 4/2022 | Zander ................. H04B 7/0617 |

OTHER PUBLICATIONS

Fraunhofer Iis et al. "Enhancements on UE multi-beam operation", 3GPP TSG RAN WG1 Meeting #96-Bis, Xi'an, China; Apr. 8-12, 2019, R1-1904217, 9 pages.

Lenovo et al. "Discussion of multi-beam operation", 3GPP TSG RAN WG1 Meeting #97, Reno, USA, May 13-17, 2019, R1-1908721, 9 pages.

Guangdong Oppo Mobile Telecom "Discussion on RS multiplexing", 3GPP TSG RAN WG1 Meeting NR#3, Nagoya, Japan, Sep. 18-21, 2017, R1-1715705, 2 pages.

VIVO "Discussion on remaining issues of additional SRS", 3GPP TSG RAN WG1 Meeting #98bis, Chongqing, China, Oct. 14-20, 2019, R1-1910195, 4 pages.

Huawei et al. "Discussion on panel activation/deactivation status", 3GPP RAN WG1 Meeting #97, Reno, USA, May 13-17, 2019, R1-1907531, 2 pages.

Qualcomm "Breaking the wireless barriers to mobilize 5G NR mmWave" Fierce Wireless Webinar, Jan. 22, 2019, 40 pages.

3GPP TS 38.331 V15.7.0 (Seo. 2019) (527 pages).

* cited by examiner

☐ 1 OFDM symbol

▨ 1 OFDM symbol with reference signal resource

TRANSMISSION OF REFERENCE SIGNAL RESOURCES AND CONFIGURATION THEREOF

CROSS REFERENCE TO RELATED APPLICATION(S)

This application is a 35 U.S.C. § 371 National Phase Entry Application from PCT/EP2020/051417, filed Jan. 21, 2020, designating the United States, the disclosure of which is incorporated herein by reference in its entirety.

TECHNICAL FIELD

Embodiments presented herein relate to a method, a terminal device, a computer program, and a computer program product for transmission of reference signal resources from the terminal device. Embodiments presented herein further relate to a method, a radio access network node, a computer program, and a computer program product for configuring the terminal device for transmission of the reference signal resources.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M can be configured by the network). Furthermore, the transmission of the reference signal on a given TX beam can be repeated to allow the terminal device to evaluate a suitable reception (RX) beam. Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

Furthermore, the CSI-RS transmission on a given TX beam can be repeated to allow the terminal device to evaluate suitable terminal device beam. This is sometimes referred to as terminal device receive beam training.

Some terminal devices might have analog beamformers without beam correspondence, which basically means that downlink/uplink reciprocity cannot be used to determine the beams for these beamformers. For such terminal devices, the terminal device beam used for uplink cannot be derived from beam management procedures based on downlink reference signals as described above. Uplink beam management can be used to handle such situation. One difference between downlink beam management and uplink beam management is that uplink reference signals (such as sounding reference signals; SRSs) are used instead of downlink references signals.

The transmission of uplink reference signals is configured by the TRP. This enables the terminal device to know for example which uplink reference signal resources to use, their time/frequency allocation, and their time domain behavior (periodic, semi-persistent or aperiodic). The corresponding configuration information is therefore signaled by TRP to the terminal device.

From the perspective of a terminal device the signals might arrive from, and emanate from, all different directions depending on the orientation of the terminal device in relation to the TRP. It might therefore be beneficial for the terminal device to have an antenna implementation which enables the generation of omni-directional-like coverage in addition to high gain narrow beams. One way to enable omni-directional-like coverage for a terminal device is for the terminal device to have more than one antenna panel, where each antenna panel is pointing in its own direction.

However, it could still be challenging for a terminal device having two or more antenna panels to transmit reference signal resources in an efficient manner.

SUMMARY

An object of embodiments herein is to enable efficient usage of the antenna panels of a terminal device for transmission of reference signal resources.

According to a first aspect there is presented a method for transmission of reference signal resources from a terminal device. The method is performed by the terminal device. The terminal device comprises at least two antenna panels and a baseband chain operable to be switched between the at least two antenna panels. The baseband chain is thereby connected to each of the antenna panels one at a time. The method comprises distributing a fixed set of reference signal resources among the at least two antenna panels by selecting which beams are to be used for transmission of the reference signal resources. The reference signal resources are distributed among the at least two antenna panels according to antenna panel selection information. The method comprises transmitting each of the reference signal resources in a respective one of the beams as the baseband chain is connected to each antenna panel used for generating the beams.

According to a second aspect there is presented a terminal device for transmission of reference signal resources. The terminal device comprises at least two antenna panels and a baseband chain operable to be switched between the at least two antenna panels. The baseband chain is thereby connected to each of the antenna panels one at a time. The terminal device further comprises processing circuitry. The processing circuitry is configured to cause the terminal device to distribute a fixed set of reference signal resources among the at least two antenna panels by selecting which beams are to be used for transmission of the reference signal resources. The reference signal resources are distributed among the at least two antenna panels according to antenna panel selection information. The processing circuitry is configured to cause the terminal device to transmit each of the reference signal resources in a respective one of the beams as the baseband chain is connected to each antenna panel used for generating the beams.

According to a third aspect there is presented a terminal device for transmission of reference signal resources. The terminal device comprises at least two antenna panels and a baseband chain operable to be switched between the at least two antenna panels. The baseband chain is thereby connected to each of the antenna panels one at a time. The terminal device further comprises a distribute module configured to distribute a fixed set of reference signal resources among the at least two antenna panels by selecting which beams are to be used for transmission of the reference signal resources. The reference signal resources are distributed among the at least two antenna panels according to antenna panel selection information. The terminal device further comprises a transmit module configured to transmit each of the reference signal resources in a respective one of the beams as the baseband chain is connected to each antenna panel used for generating the beams.

According to a fourth aspect there is presented a computer program for transmission of reference signal resources from a terminal device. The computer program comprises computer program code which, when run on processing circuitry of a terminal device, causes the terminal device to perform a method according to the first aspect.

According to a fifth aspect there is presented a method for configuring a terminal device for transmission of reference signal resources. The method is performed by a radio access network node. The method comprises transmitting, to the terminal device, configuration information. The configuration information specifies how many reference signal resources the terminal device is to transmit and time slots in which the reference signal resources are to be transmitted. The configuration information is based on antenna panel selection information of the terminal device.

According to a sixth aspect there is presented a radio access network node for configuring a terminal device for transmission of reference signal resources. The radio access network node comprises processing circuitry. The processing circuitry is configured to cause the radio access network node to transmit, to the terminal device, configuration information. The configuration information specifies how many reference signal resources the terminal device is to transmit and time slots in which the reference signal resources are to be transmitted. The configuration information is based on antenna panel selection information of the terminal device.

According to a seventh aspect there is presented a radio access network node for configuring a terminal device for transmission of reference signal resources. The radio access network node comprises a transmit module configured to transmit, to the terminal device, configuration information. The configuration information specifies how many reference signal resources the terminal device is to transmit and time slots in which the reference signal resources are to be transmitted. The configuration information is based on antenna panel selection information of the terminal device.

According to an eight aspect there is presented a computer program for configuring a terminal device for transmission of reference signal resources, the computer program comprising computer program code which, when run on processing circuitry of a radio access network node, causes the radio access network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these aspects provide efficient usage of the antenna panels of the terminal device for transmission of reference signal resources.

Advantageously these aspects enable the terminal device to determine a proper distribution of the reference signal resources among its antenna panels, and among its transmission beams, for transmission of the reference signal resources, for example during an uplink beam management procedure.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
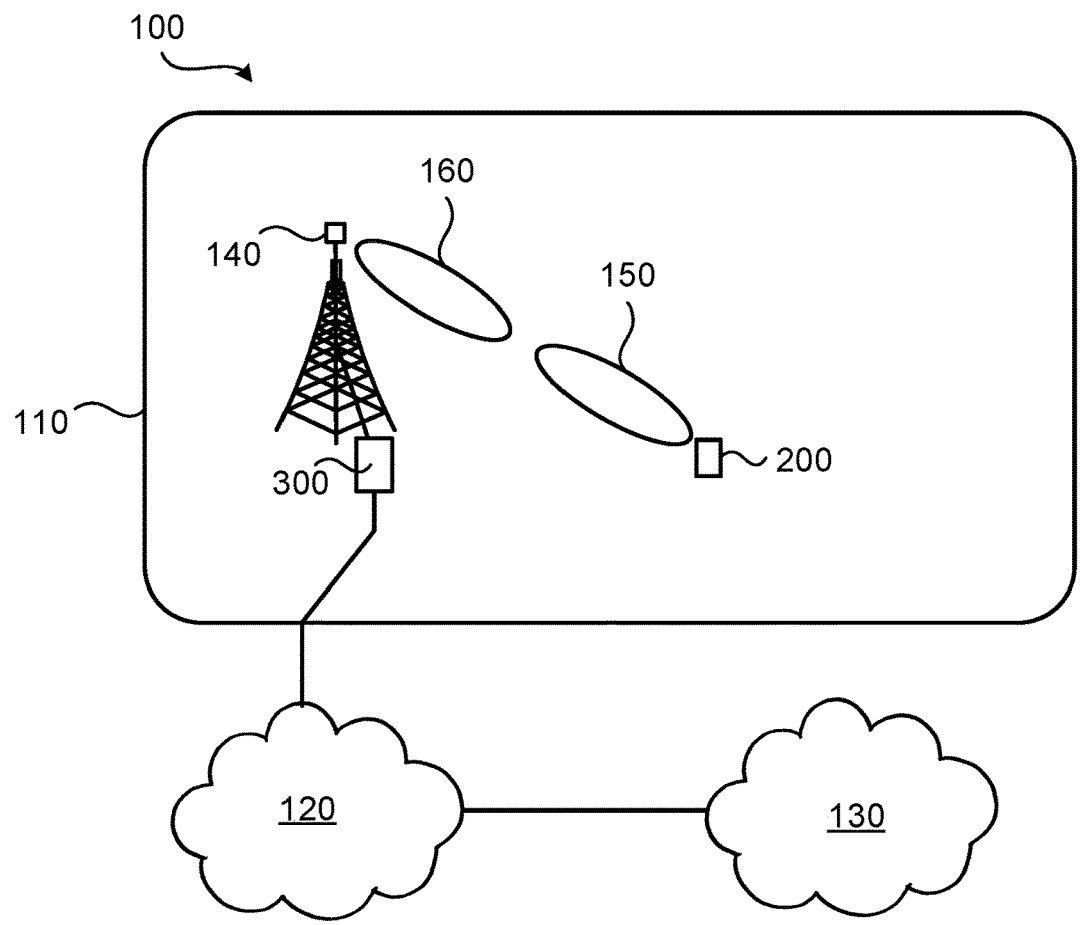
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a radio network node 300 configured to provide network access to at least one terminal device 200 in a radio access network 110. The radio access network 110 is operatively connected to a core network 120. The core network 120 is in turn operatively connected to a service network 130, such as the Internet. The terminal device 200 is thereby enabled to, via the radio access network node 300, access services of, and exchange data with, the service network 130.

The radio access network node 300 comprises, is collocated with, is integrated with, or is in operational communications with, a transmission and reception point (TRP) 140. The radio access network node 300 (via its TRP 140) and the terminal device 200 are configured to communicate with each other in respective sets of beams 150, 160, where only one beam in each set is illustrated in FIG. 1.

Examples of radio access network nodes 300 are radio base stations, base transceiver stations, Node Bs, evolved Node Bs, g Node Bs, access points, and access nodes, and backhaul nodes. Examples of terminal devices 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

As disclosed above it could be challenging for a terminal device 200 having two or more antenna panels to transmit reference signal resources in an efficient manner.

The embodiments disclosed herein therefore relate to mechanisms for transmission of reference signal resources from a terminal device 200 and configuring a terminal device 200 for transmission of reference signal resources. In order to obtain such mechanisms there is provided a terminal device 200, a method performed by the terminal device 200, a computer program product comprising code, for example in the form of a computer program, that when run on processing circuitry of the terminal device 200, causes the terminal device 200 to perform the method. In order to obtain such mechanisms there is further provided a radio access network node 300, a method performed by the radio access network node 300, and a computer program product comprising code, for example in the form of a computer program, that when run on processing circuitry of the radio access network node 300, causes the radio access network node 300 to perform the method.

The terminal device 200 comprises at least two antenna panels and a baseband chain. Each antenna panel might have a single port that is connected to a group of antenna elements through a common distribution network. The baseband chain is operable to be switched between the at least two antenna panels. The baseband chain is thereby connected to each of the antenna panels one at a time. In this respect, each antenna panel might comprise dual-polarized antenna elements and one baseband chain per polarization might then be connected to the antenna panels one at a time. Hence, the terminal device 200 might have two baseband chains which are switched between the at least two antenna panels. However, in some aspects only one of the baseband chains is switched between the antenna panels even if the antenna panels comprise dual-polarized antenna elements. In other aspects, each antenna panel might comprise only single-polarized antenna elements and where dual polarizing is obtained by combining two such antenna panels having single-polarized antenna elements of different polarizations.

Figure 2:
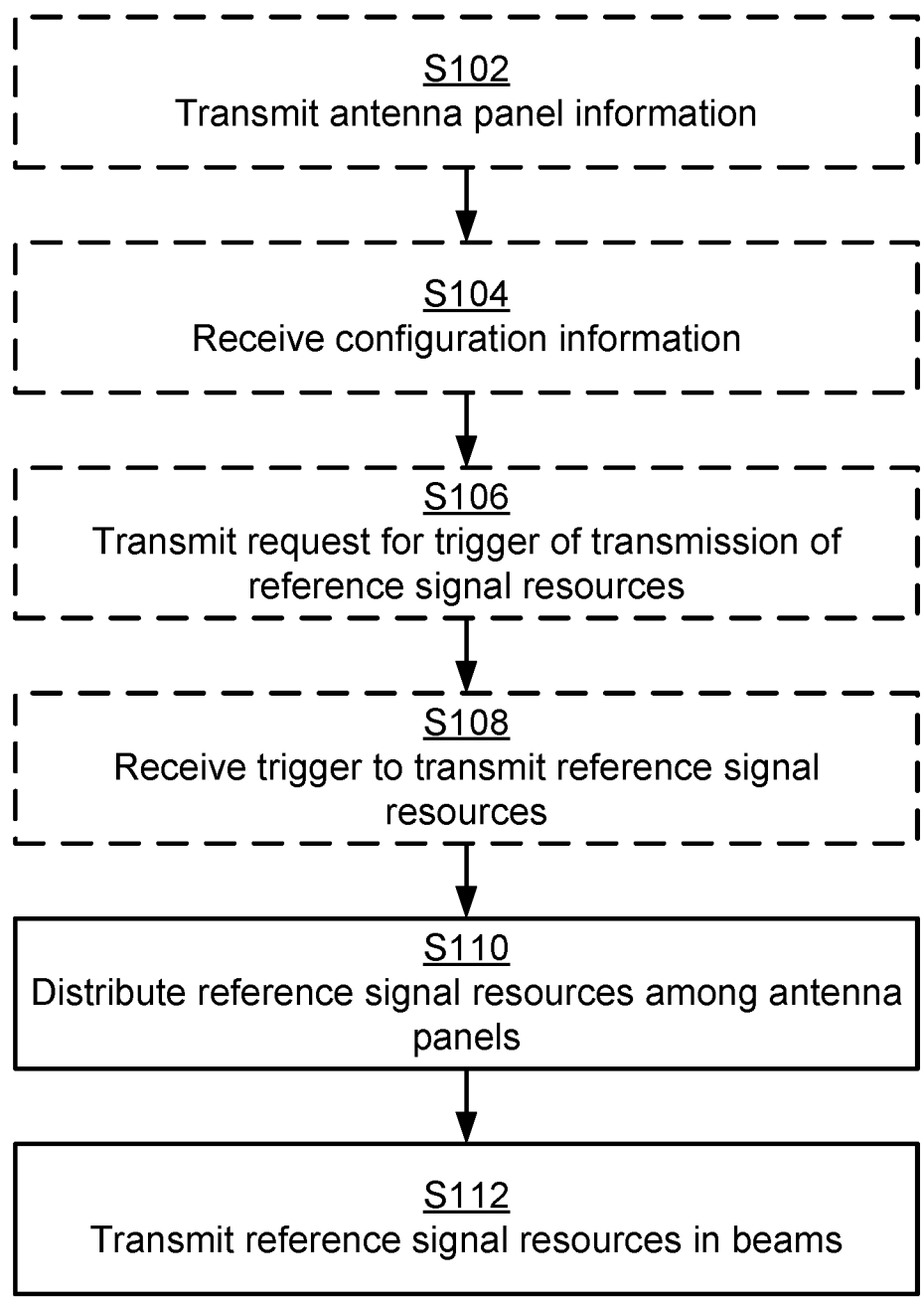
FIGS. 2 and 3 are flowcharts of methods according to embodiments.

Reference is now made to FIG. 2 illustrating a method for transmission of reference signal resources from a terminal device 200 as performed by the terminal device 200 according to an embodiment.

S110: The terminal device 200 distributes a fixed set of reference signal resources among the at least two antenna panels. The fixed set of reference signal resources are distributed by the terminal device 200 selecting which beams are to be used for transmission of the reference signal resources. The reference signal resources are distributed among the at least two antenna panels according to antenna panel selection information. Examples of antenna panel selection information will be provided below.

This enables the terminal device 200 to distribute the fixed set of reference signal resources among the at least two antenna panels in an optimal way. Upon having distributed the reference signal resources, the reference signal resources are transmitted.

S112: The terminal device 200 transmits each of the reference signal resources in a respective one of the beams as the baseband chain is connected to each antenna panel used for generating the beams.

Embodiments relating to further details of transmission of reference signal resources from a terminal device 200 as performed by the terminal device 200 will now be disclosed.

There could be different examples of antenna panel selection information. In some non-limiting examples, the antenna panel selection information pertains to at least one of: measurements of previously received reference signals (using one or more of the antenna panels with shared or individual baseband chains), time duration since reception of the previously received reference signals, estimated rotation of the terminal device 200 since reception of the previously received reference signals, blocking status of each of the antenna panels (i.e., how much each antenna panel is blocked by an object), how many antenna panels are connectable to each baseband chain at the terminal device 200, how long it takes for the baseband chain to be switched from one of the antenna panels to another of the antenna panels, mounting geometry of the antenna panels at the terminal device 200 (i.e., in which directions the antenna panels are mounted at the terminal device 200). The longer time it takes for the baseband chain 240 to be switched from one of the antenna panels to another one of the antenna panels and the more antenna panels the terminal device 200 is equipped with, the more reference signal resources are consumed when there is a need to change the baseband chain 240 from one of the antenna panels to another one of the antenna panels.

Examples of how different pieces of such antenna panel selection information might be used by the terminal device 200 to distribute the reference signal resources among the at least two antenna panels will be disclosed below.

Aspects of signalling between the terminal device 200 and the radio access network node 300 preceding the transmission of the reference signal resources will now be disclosed.

In some aspects, as will be further disclosed below, the radio access network node 300 configures the terminal device 200 with how many reference signal resources the terminal device 200 is to transmit and time slots in which the reference signal resources are to be transmitted. This configuration information is based on antenna panel selection information of the terminal device 200. In some aspects, the terminal device 200 therefore provides at least part of the antenna panel selection information to the radio access network node 300. Hence, according to an embodiment, the terminal device 200 is configured to perform (optional) action S1o2:

S102: The terminal device 200 transmits, to the radio access network node 300 as providing network access for the terminal device 200, at least part of the antenna panel selection information.

However, in other embodiments the radio access network node 300 already has access to at least part of the antenna panel selection information.

In some aspects, as will be further disclosed below, the radio access network node 300 provides configuration information to the terminal device 200. Hence, according to an embodiment, the terminal device 200 is configured to perform (optional) action S104:

S104: The terminal device 200 receives, from the radio access network node 300 as providing network access for the terminal device 200, configuration information. The configuration information specifies how many reference signal resources to transmit and time slots in which the reference signal resources are to be transmitted. The reference signal resources are then transmitted in S112 according to the configuration information.

In some aspects, the reference signal resources are transmitted upon the terminal device 200 being triggered to do so by the radio access network node 300. In particular, according to an embodiment, the terminal device 200 is configured to perform (optional) action S108:

S108: The terminal device 200 receives, from the radio access network node 300 as providing network access for the terminal device 200, a trigger for the terminal device 200 to transmit the reference signal resources.

Actions S104 and S108 might be combined into one action where the trigger for the terminal device 200 to transmit the reference signal resources thus is received together with the configuration information. In this case a bit or flag could be set when transmission of the reference signal resources is triggered. A further bit or flag could be set when transmission of zero-power reference signal resources is allowed.

In some aspects, transmission of the reference signal resources is requested by the terminal device 200. The reception of the trigger in S108 might thus be preceded by transmission by the terminal device 200 of a request for the trigger. Hence, according to an embodiment, the terminal device 200 is configured to perform (optional) action S106:

S106: The terminal device 200 transmits, to the radio access network node 300 as providing network access for the terminal device 200, a request to trigger the terminal device 200 to transmit the reference signal resources.

The trigger for the terminal device 200 to transmit the reference signal resources might then be received in S108 in response to the terminal device 200 having transmitted the request in S106.

The request might in S106 be transmitted upon the terminal device 200 detecting that a key performance indicator (KPI) or other quality indicator pertaining to received data, control information, or measurements on downlink reference signals, is below a performance quality threshold.

Aspects of the reference signal resources will now be disclosed.

For example, in case the reference signal resources are configured to be transmitted in adjacent OFDM symbols and the terminal device 200 needs one or more OFDM symbols to switch the baseband chain from one of the antenna panels to another of the antenna panels, then there could be a zero-power transmission of one or more reference signal resources during this switch. That is, according to an embodiment, a zero-power reference signal resource is transmitted during switching of the baseband chain from one of the antenna panels to another of the antenna panels.

This could enable the terminal device 200 to transmit the reference signal resources without explicit configuration information from the radio access network node 300. Alternatively, the radio access network node 300 might explicitly configure the terminal device 200 for transmission of zero-power reference signal resources. That is, according to an embodiment, the configuration information as received in S1o4 further specifies that the terminal device 200 is allowed to transmit one or more zero-power reference signal resources. In further detail, the radio access network node 300 might signals to the terminal device 200 that the terminal device 200 is allowed to, for example during an uplink beam management procedure (and hence use zero power transmission for some reference signal resources of a reference signal resource set), freely switch from one of the antenna panels to another of the antenna panels.

In other examples, the terminal device 200 is not allowed to, or configured to, transmit one or more zero-power reference signal resources. Hence, according to an embodiment, no reference signal resource is transmitted during switching of the baseband chain from one of the antenna panels to another of the antenna panels. This could be enabled by the use of one or more guard periods. In particular, according to an embodiment, the baseband chain is to be switched from one of the antenna panels to another of the antenna panels during a guard period. The guard period should thus have such long duration in time that enables the baseband chain to be switched from one of the antenna panels to another of the antenna panels.

It could be that the baseband chain does not need to be switched from one of the antenna panels to another of the antenna panels during a guard period, for example if the current and the next reference signal resources are to be transmitted from one and the same antenna panel. Then the guard period could be used for either transmission or reception of data. That is, according to an embodiment, when the baseband chain does not need to be switched from one of the antenna panels to another of the antenna panels during the guard period, data is either received by the terminal device 200 during the guard period or transmitted by the terminal device 200 during the guard period. The data could be control information, or even other types of reference signals than transmitted in S112.

There could be different lengths of the guard period. For a sub-carrier spacing below 120 kHz the guard period could be one OFDM symbol, whilst for a sub-carrier spacing of 120 kHz the guard period could be two OFDM symbols. This implies that terminal device 200 is expected to be able to switch the baseband chain from one of the antenna panels to another of the antenna panels within one or two OFDM symbols, depending on sub-carrier spacing. Hence, in some examples the guard period timewise corresponds to one or two OFDM symbols. However, in other examples the guard period is timewise longer than two OFDM symbols, for example where transmission of the reference signal resources as in S112 extends over two or more slots.

In some aspects, the radio access network node 300 is aware of that the terminal device 200 sometimes need to switch its baseband chain between the antenna panels, and the required time to do so. That is, according to an embodiment, the configuration information as received in S104 further specifies time slots for the guard period. One way to make the radio access network node 300 aware of that the terminal device 200 sometimes need to switch its baseband chain between the antenna panels, and the required time to do so, is for the terminal device 200 to provide the radio access network node 300 with such information, for example by providing such information in above S102.

In some examples the terminal device 200 comprises exactly two antenna panels or exactly three antenna panels. Further, each of the two or more antenna panels might point in its own pointing direction. This might increase the omnidirectional-like coverage of the terminal device 200.

In some examples, the reference signal resources are transmitted in beams of at least two different beam widths. For example, the beam width might be inversely proportional to the number of beams generated at each antenna panel such that the beam width for beams generated at a given antenna panel decreases as the number of beams for that given antenna panel increases.

There could be different scenarios according to which the reference signal resources are transmitted. According to an embodiment, the reference signal resources are transmitted during an uplink beam management procedure as performed by the terminal device 200. Thus, based on the antenna panel selection information the terminal device 200 might determine candidate beams and corresponding antenna panels to be used for uplink beam management procedures. This means that during one reference signal transmission occasion of one reference signal resource set, different reference signal resources might be transmitted from different antenna panels at the terminal device 200.

Figure 3:
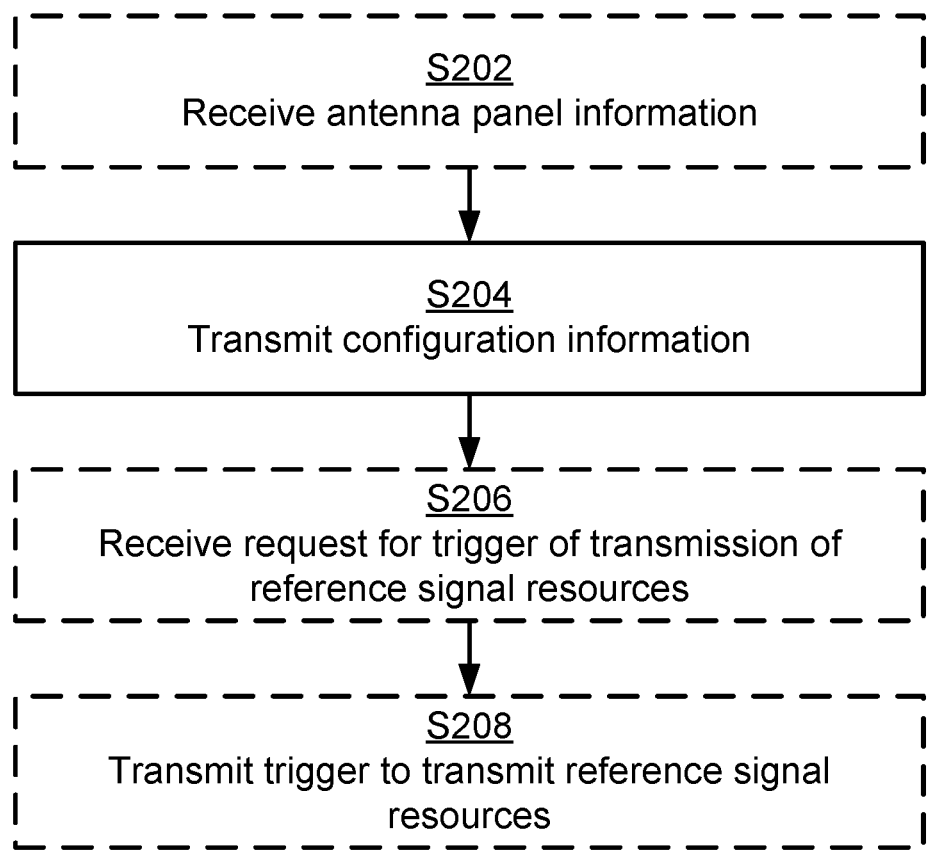

Reference is now made to FIG. 3 illustrating a method for configuring a terminal device 200 for transmission of reference signal resources as performed by the radio access network node 300 according to an embodiment.

The radio access network node 200, based on antenna panel selection information of the terminal device 200, configures reference signal resources for the terminal device 200. In particular, the radio access network node 300 is configured to perform action S204:

S204: The radio access node 300 transmits, to the terminal device 200, configuration information. The configuration information specifies how many reference signal resources the terminal device 200 is to transmit and time slots in which the reference signal resources are to be transmitted. The configuration information is based on antenna panel selection information of the terminal device 200.

Embodiments relating to further details of configuring a terminal device 200 for transmission of reference signal resources as performed by the radio access network node 300 will now be disclosed.

Aspects of signalling between the radio access network node 300 and the terminal device 200 will now be disclosed.

As disclosed above, the radio access network node 300 might explicitly configure the terminal device 200 for transmission of zero-power reference signal resources. Hence, according to an embodiment, the configuration information in S204 further specifies that the terminal device 200 is allowed to transmit one or more zero-power reference signal resources. For example, the radio access network node 300 might in S204 indicate to the terminal device 200 that it is allowed for the terminal device 200 to perform zero-power transmission for one or several reference signal resource in a reference signal resource set. This could be signaled for example using radio resource control (RRC) signalling, signalling in a medium access control (MAC) control element (CE), or signalling of downlink control information (DCI).

As disclosed above, the configuration information further specifies time slots for a guard period. Hence, according to an embodiment, the configuration information in S204 further specifies time slots for a guard period during which no reference signal resources are allowed to be transmitted (from the terminal device 200). The radio access network node 300 might thereby configure the transmission of the reference signal resource such that the reference signal resources are distributed in time such that the time required at the terminal device 200 for switching of the baseband chain from one of the antenna panels to another of the antenna panels is considered among the reference signal resources.

For example, instead of allocating all reference signal resources one directly after the other in the last OFDM symbols of a slot, the radio access network node 300 might allocates half of the reference signal resources first, then no reference signal resources for one or two OFDM symbols (depending on panel switching time) and then the remaining half of the reference signal resources in the last OFDM symbols. In this way the terminal device 200 might (if determined to do so), transmit half of the reference signal resources from one of its antenna panels, and then switch (during one or two OFDM symbols) to a another of its antenna panels and transmit the remaining half of the reference signal resources from that antenna panel. As the skilled person understands, the maximum number of needed guard periods is equal to one less than the total number of antenna panels at the terminal device 200. As noted above, in some examples the guard period timewise corresponds to one or two OFDM symbols, but in other examples the guard period is timewise longer than two OFDM symbols. The radio access network node 300 might thus configure the terminal device 200 with reference signal resources such that the terminal device 200 will have sufficient time (if desired) to switch its baseband chain between different antenna panels when reference signal resources need to be transmitted, for example during an uplink beam management procedure.

As disclosed above, in some aspects, the terminal device 200 provides at least part of the antenna panel selection information to the radio access network node 300. Hence, according to an embodiment, the radio access network node 300 is configured to perform (optional) action S202:

S202: The radio access network node 300 receives, from the terminal device 200, at least part of the antenna panel selection information specifying how many antenna panels are connectable to each baseband chain at the terminal device 200.

As disclosed above, in some aspects, the antenna panel information further specifies how long switching of the baseband chain from one of the antenna panels to another of the antenna panels takes.

As disclosed above, in some aspects, the terminal device 200 is triggered to transmit the reference signal resources upon being triggered to do so by the radio access network node 300. Hence, according to an embodiment, the radio access network node 300 is configured to perform (optional) action S208:

S208: The radio access network node 300 transmits, to the terminal device 200, a trigger for the terminal device 200 to transmit the reference signal resources.

Actions S204 and S208 might be combined into one action where the trigger for the terminal device 200 to transmit the reference signal resources thus is transmitted together with the configuration information. The radio access network node 300 could set a bit or flag could when transmission of the reference signal resources is triggered. A further bit or flag could be set by the radio access network node 300 when transmission of zero-power reference signal resources is allowed.

As disclosed above, in some aspects, the terminal device 200 requests transmission of the reference signal resources. Hence, according to an embodiment, the radio access network node 300 is configured to perform (optional) action S206:

S206: The radio access network node 300 receives, from the terminal device 200, a request to trigger the terminal device 200 to transmit the reference signal resources.

The trigger for the terminal device 200 to transmit the reference signal resources might then be transmitted in S208 in response to the radio access network node 300 having received the request in S206.

As disclosed above, the reference signal resources might be transmitted during an uplink beam management procedure as performed by the terminal device 200. Hence, according to an embodiment, the configuration information as transmitted in S204 is valid for transmission of the reference signal resources during an uplink beam management procedure as performed by the terminal device 200.

Embodiments, aspects, and examples, as valid for, and applicable to, the terminal device 200 as well as the radio access network node 300.

Figure 4:
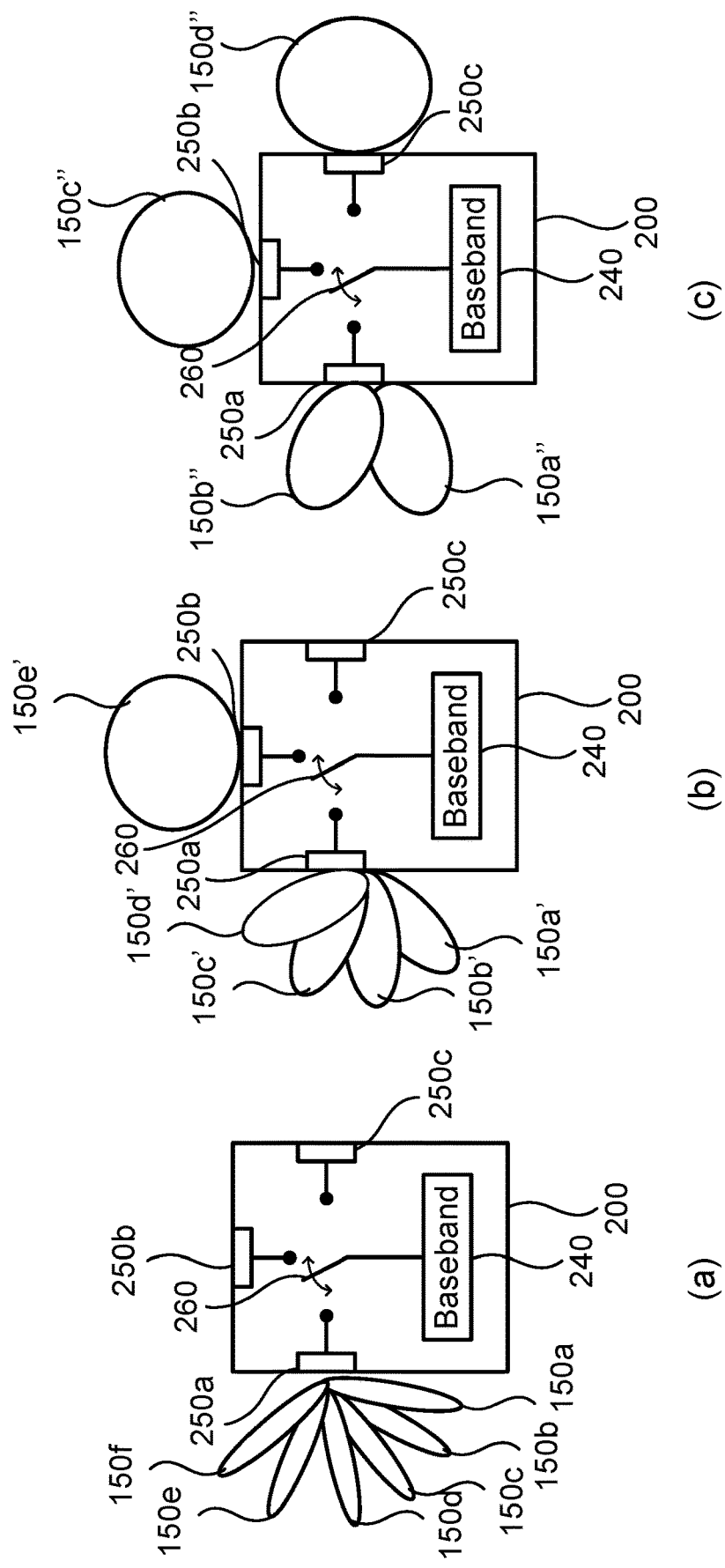
FIGS. 4 and 5 are schematic illustrations of terminal device with three antenna panels and two antenna panels, respectively, according to embodiments.

Reference is made to FIG. 4 which at (a), (b), (c) schematically illustrates three different scenarios wherein the herein disclosed embodiments are applicable. FIG. 4 schematically illustrates a terminal device 200 equipped with one baseband chain 240 and three antenna panels 250*a*, 250*b*, 250*c*, where each antenna panel 250*a*, 250*b*, 250*c* has its own pointing direction, and where the baseband chain 240 is switchable between the three antenna panels 250*a*, 250*b*, 250*c* by means of a switch 260. It is assumed that it takes one OFDM symbol for the baseband chain 240 to be switched from one of the antenna panels 250*a*, 250*b*, 250*c* to another one of the antenna panels 250*a*, 250*b*, 250*c*. It is for illustrative purposes assumed that during an earlier beam management procedure (or based on e.g. earlier measurements of received downlink reference signals) that the leftmost antenna panel 250*a* has the highest path gain to the serving radio access network node 300 (not shown in FIG. 4). It is for illustrative purposes further assumed that the terminal device 200 is scheduled, or configured, with transmission of six uplink reference signal resources, thus defining the fixed set of reference signal resources. The terminal device 200 is then to distribute this fixed set of reference signal resources among the three antenna panels 250*a*, 250*b*, 250*c*.

According to FIG. 4(*a*) the terminal device 200 distributes the reference signal resources among only the leftmost antenna panel 250*a* and the terminal device 200 sweeps through six narrow beams 150*a*:150*f* as generated at this antenna panel.

However, in case it was some time ago since the terminal device 200 determined which of the antenna panels has the highest path gain, it is possible that the terminal device 200 has rotated, moved, been blocked, and/or that the radio propagation channel between the serving radio access network node 3 and the terminal device 200 has been changed for some other reasons, hence selecting all narrow beams from only the previously best antenna panel might not be optimal. The terminal device 200 might therefore estimate how valid it is that the previously determined best antenna panel still is the best one (e.g., in terms of highest path gain). This could be based for example on how long time ago it was since that the terminal device 200 determined which antenna panel was the best one, how much the terminal device 200 has rotated and/or moved during this time, and/or based on how much the radio propagation channel for the best antenna panel has changed (e.g. based on measurements on downlink reference signals). For example if the previous best beam is one of the edge beams of one of the antenna panels, than it is likely that the neighboring edge beam on the neighboring antenna panel is a good choice as a candidate beam for the coming uplink beam management procedure and thus the reference signal resources should in Silo be distributed accordingly.

In case the terminal device 200 estimates that there is a large chance that the same antenna panel is still the best one, the terminal device 200 distributes the reference signal resources among only the leftmost antenna panel 250*a*, as in FIG. 4(*a*).

In case the terminal device 200 estimates that the same antenna panel might no longer be the best one, and that for example the centermost antenna panel 250*b* might be the best one (for example due to rotation and/or movement of the terminal device), the terminal device 200 distributes the reference signal resources among the leftmost antenna panel 250*a* and the centermost antenna panel 250*b*, as in FIG. 4(*b*). In this case the terminal device 200 thus sweeps through a number of beams 150*a*':150*d*' (four in the present example) from the previously best antenna panel, then switches the baseband chain 240 from this antenna panel to the centermost antenna panel 250*b* (where the switching time takes one OFDM symbol, i.e. consumes one of the reference signal resources), and then transmit one reference signal resource in one wide beam 150*e*' from the centermost antenna panel 250*b*. In FIG. 4(*b*) a zero-power reference signal resource might be transmitted in the OFDM symbol when the baseband chain 240 is switched from the leftmost antenna panel 250*a* to the centermost antenna panel 250*b*.

In case the terminal device 200 estimates that the same antenna panel might no longer be the best one, but cannot estimate which of the other antenna panels is the best one, the terminal device 200 distributes the reference signal resources among all the antenna panel, as in FIG. 4(*c*). In this case the terminal device 200 thus sweeps through a number of beams 150*a*", 150*b*" (two in the present example) from the previously best antenna panel, then switches the baseband chain 240 from this antenna panel to the centermost antenna panel 250*b* (where the switching time takes one OFDM symbol, i.e. consumes one of the reference signal resources), and then transmit one reference signal resource in one wide beam 150*c*" from the centermost antenna panel 250*b*, then switches the baseband chain 240 from this antenna panel to the rightmost antenna panel 250*c* (where the switching time again takes one OFDM symbol, i.e. again consumes one of the reference signal resources), and then transmit one reference signal resource in one wide beam 150*d*" from the rightmost antenna panel 250*c*. In FIG. 4(*c*) a zero-power reference signal resource might be transmitted in the OFDM symbol when the baseband chain 240 is switched from the leftmost antenna panel 250*a* to the centermost antenna panel 250*b* and another zero-power reference signal resource might be transmitted in the OFDM symbol when the baseband chain 240 is switched from the centermost antenna panel 250*b* to the rightmost antenna panel 250*c*.

Exactly how many beams, and which kind of beam width the terminal device will select for each respective antenna panel can be varied in many ways. It should also be noted that if narrow beams are used for one antenna panel, and for example one wide beam is used for another antenna panel, the gain of the beams for the different antenna panels will differ. However, since the path gain difference between the best antenna panel and second-best antenna panel might be assumed to be large, this might still enable the best antenna panel to be determined.

Figure 5:
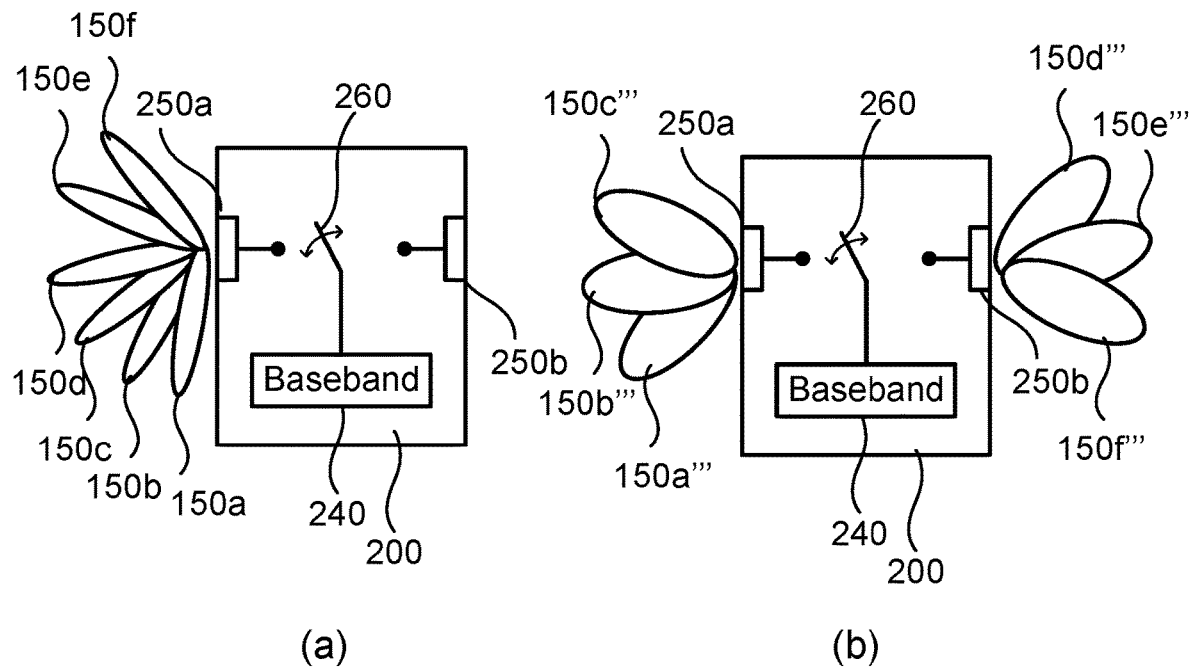
Figure 6:
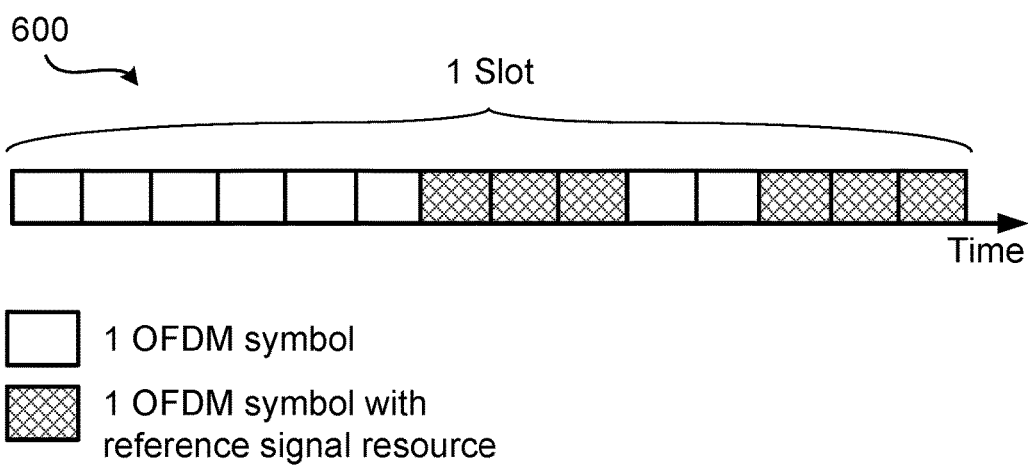
FIG. 6 is a schematic illustration of a slot for scheduling of reference signal resources according to an embodiment.

Reference is made to FIG. 5 which at (a) and (b) schematically illustrates two different scenarios wherein the herein disclosed embodiments are applicable. FIG. 5 schematically illustrates a terminal device 200 equipped with one baseband chain 240 and two antenna panels 250*a*, 250*b*, where each antenna panel 250*a*, 250*b* has its own pointing direction, and where the baseband chain 240 is switchable between the two antenna panels 250*a*, 250*b* by means of a switch 260. It is assumed that it takes two OFDM symbols for the baseband chain 240 to be switched from one of the antenna panels 250*a*, 250*b* to another one of the antenna panels 250*a*, 250*b*. It is for illustrative purposes assumed that during an earlier beam management procedure (or based on e.g. earlier measurements of received downlink reference signals) that the left antenna panel 250*a* has the highest path gain to the serving radio access network node 300 (not shown in FIG. 5). It is for illustrative purposes further assumed that the terminal device 200 is scheduled, or configured, with transmission of six uplink reference signal resources, thus defining the fixed set of reference signal resources. It is further assumed that the terminal device 200 has been configured to transmit the six uplink reference signal resources according to the slot illustrated in FIG. 6. FIG. 6 illustrates one slot 600 consisting of 14 OFDM symbols and where uplink reference signal resources are scheduled in OFDM symbols 7, 8, 9, 12, 13, 14, and where OFDM symbols 10, 11 define a guard period. The terminal device 200 is then to distribute this fixed set of reference signal resources among the two antenna panels.

According to FIG. 5(*a*) the terminal device 200 distributes the reference signal resources among only the left antenna panel 250*a* and the terminal device 200 sweeps through six narrow beams 150*a*:150*f* as generated at this antenna panel, where no reference signal resource is transmitted in the OFDM symbols corresponding to the guard period.

According to FIG. 5(*b*) the terminal device 200 distributes half of the reference signal resources among the left antenna panel 250*a* and the other half of the reference signal resources among the right antenna panel 250*b* and thus sweeps through three narrow beams 150*a*''':150*c*''', and 150*d*''':150*f*''' as generated at each of the antenna panels 250*a*, 250*b*, where a switch of the baseband chain 240 from the left antenna panel 250*a* to the right antenna panel 250*b* is made during the guard period.

In this way it is thus possible for the terminal device 200 to either sweep through six beams from one single antenna panel, or sweep through three beams from one antenna panel, switch the baseband chain 240 to the other antenna panel, and then sweep through three beams from this other antenna panel.

Figure 7:
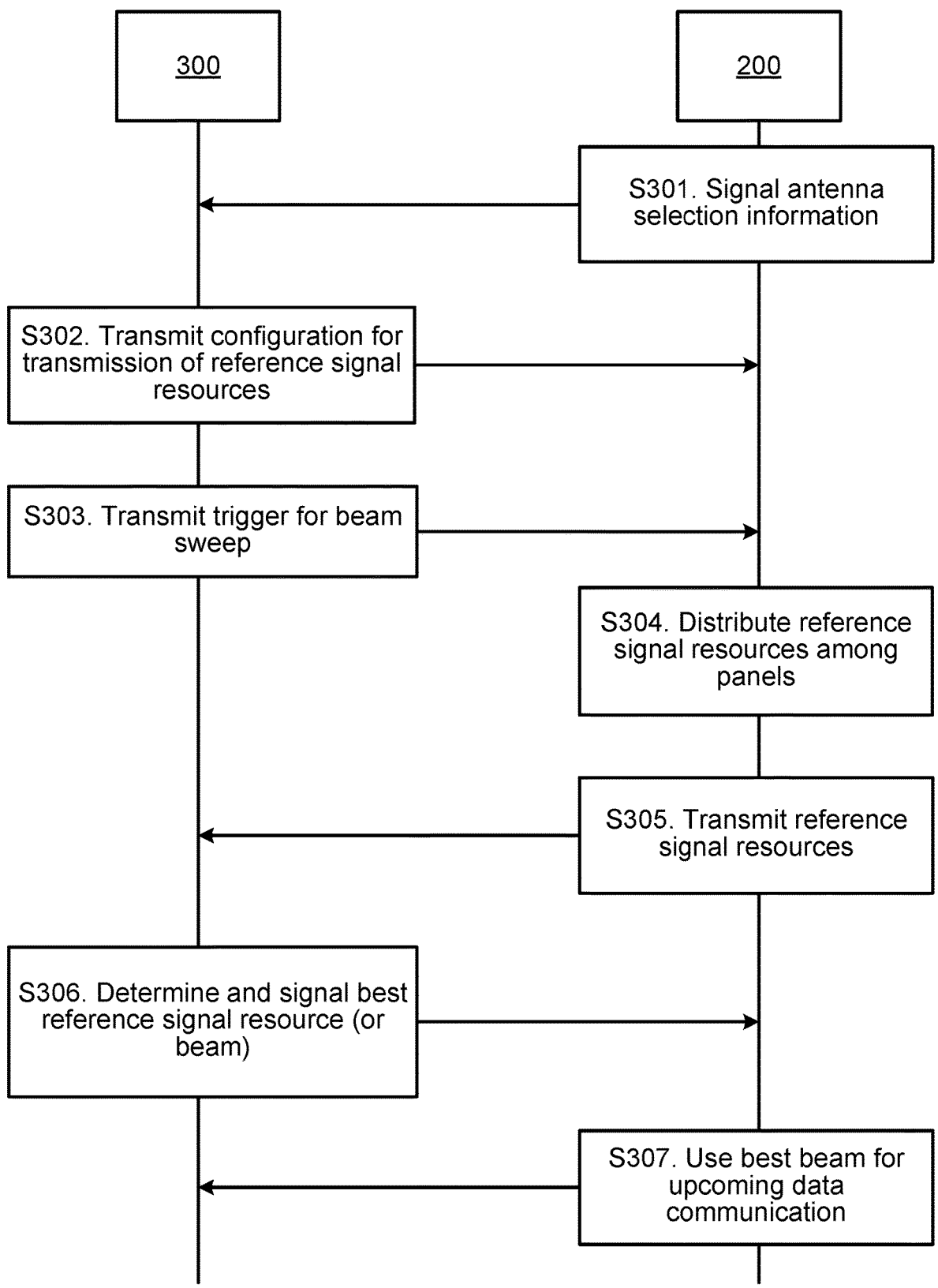
FIG. 7 is a signalling diagram of a method according to an embodiment.

One particular embodiment for transmission of reference signal resources from the terminal device 200 as well as for configuring the terminal device 200 for transmission of the reference signal resources based on at least some of the above disclosed embodiments will now be disclosed in detail with reference to the signalling diagram of FIG. 7.

S301: The terminal device 200 transmits, to the radio access network node 300 providing network access for the terminal device 200, antenna panel selection information at least specifying how many antenna panels 250*a*:250*c* are connectable to each baseband chain 240 at the terminal device 200 and how long it takes for the baseband chain 240 to be switched from one of the antenna panels 250*a*:250*c* to another of the antenna panels 250*a*:250*c*.

S302: The radio access network node 300 transmits, to the terminal device 200, configuration information. The configuration information specifies how many reference signal resources the terminal device 200 is to transmit and time slots in which the reference signal resources are to be transmitted (and, optionally, whether transmission of zero-power reference signal resources is allowed or not). The configuration information is based on the antenna panel selection information of the terminal device 200.

S303: The radio access network node 300 transmits, to the terminal device 200, a trigger for the terminal device 200 to transmit the reference signal resources.

S304: The terminal device 200 distributes the reference signal resources among its antenna panels 250*a*:250*c* by selecting which beams are to be used for transmission of the reference signal resources. The reference signal resources are distributed among the at least two antenna panels 250*a*:250*c* according to the antenna selection information.

S305: The terminal device 200 transmits each of the reference signal resources in a respective one of the beams as the baseband chain 240 is connected to each antenna panel used for generating the beams.

S306: The radio access network node 300 determines, from measurements of the reference signal resources, which of the reference signal resources was received with highest path gain at the radio access network node 300 and signals an identifier of this reference signal resource (or the corresponding beam used for transmission of this reference signal resource) to the terminal device 200.

S307: The terminal device 200 uses the beam corresponding to the signalled identifier for upcoming data communication with the radio access network node 300.

Figure 8:
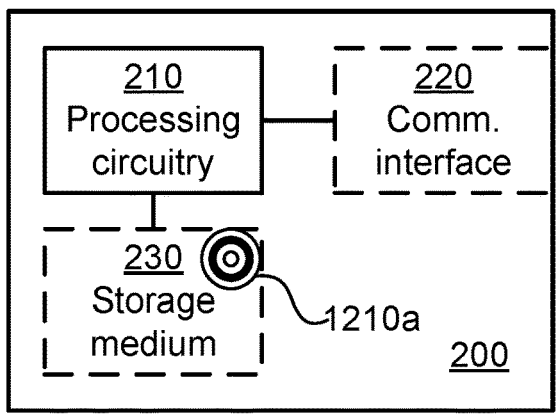
FIG. 8 is a schematic diagram showing functional units of a terminal device according to an embodiment.

FIG. 8 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or actions, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200 may further comprise a communications interface 220 for communications with the radio access network node 300. As such the communications interface 220 may comprise one or more transmitters and receivers, comprising analogue and digital components. Particularly, the communications interface 220 comprises at least two antenna panels.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 9:
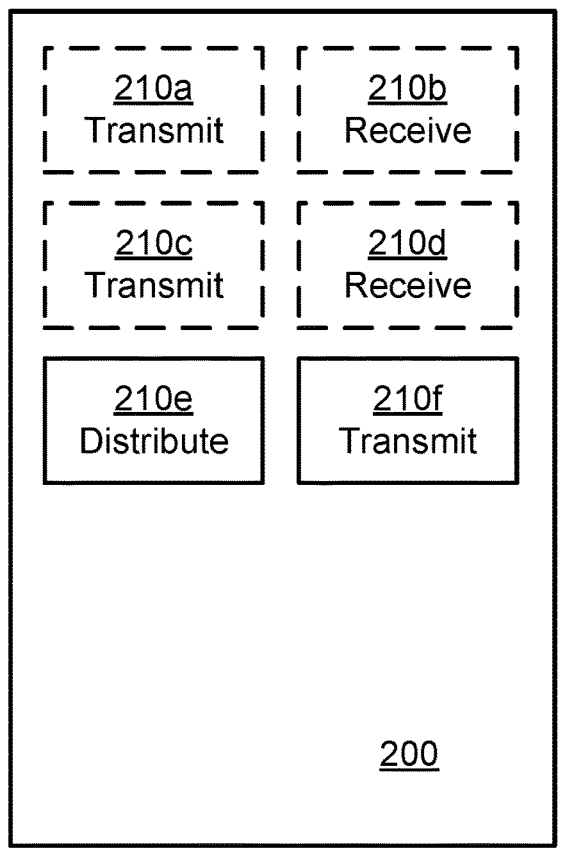
FIG. 9 is a schematic diagram showing functional modules of a terminal device according to an embodiment.

FIG. 9 schematically illustrates, in terms of a number of functional modules, the components of a terminal device 200 according to an embodiment. The terminal device 200 of FIG. 9 comprises a number of functional modules; a distribute module 210e configured to perform action Silo, and a transmit module 210f configured to perform action S112. The terminal device 200 of FIG. 9 may further comprise a number of optional functional modules, such as any of a transmit module 210a configured to perform action S102, a receive module 210b configured to perform action S104, a transmit module 210C configured to perform action S106, and a receive module 210d configured to perform action S108. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any actions of the terminal device 200 as disclosed herein.

Figure 10:
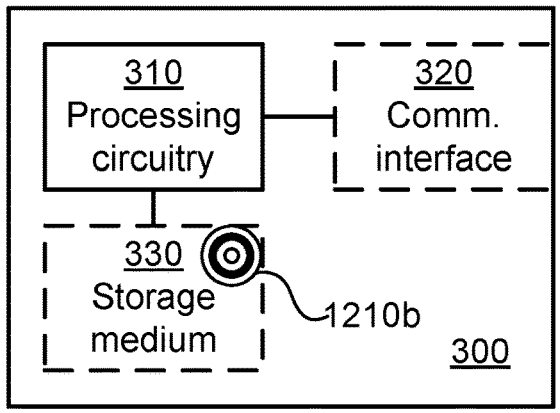
FIG. 10 is a schematic diagram showing functional units of a radio access network node according to an embodiment.

FIG. 10 schematically illustrates, in terms of a number of functional units, the components of a radio access network node 300 according to an embodiment.

Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the radio access network node 300 to perform a set of operations, or actions, as disclosed above. For example, the storage medium 330 may store the set of operations, and the processing circuitry 310 may be configured to retrieve the set of operations from the storage medium 330 to cause the radio access network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio access network node 300 may further comprise a communications interface 320 for communications with the terminal device 200. As such the communications interface 320 may comprise one or more transmitters and receivers, comprising analogue and digital components.

The processing circuitry 310 controls the general operation of the radio access network node 300 e.g. by sending data and control signals to the communications interface 320 and the storage medium 330, by receiving data and reports from the communications interface 320, and by retrieving data and instructions from the storage medium 330. Other components, as well as the related functionality, of the radio access network node 300 are omitted in order not to obscure the concepts presented herein.

Figure 11:
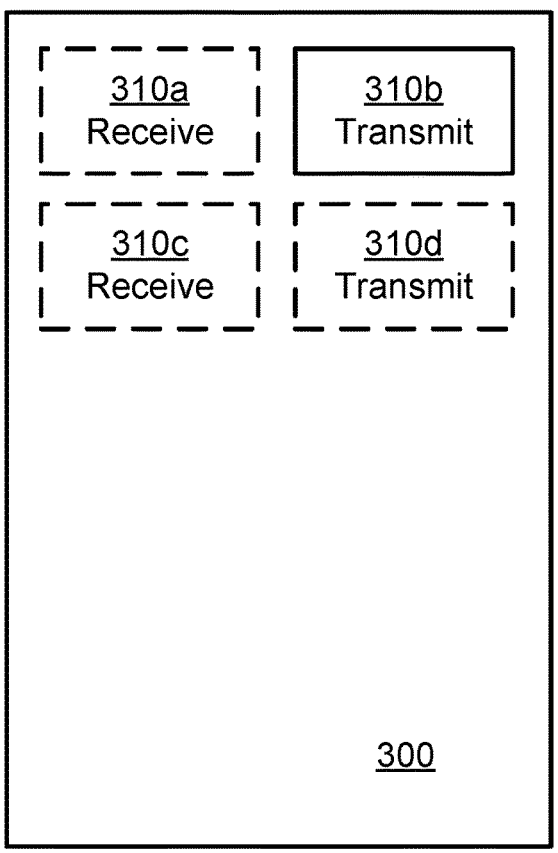
FIG. 11 is a schematic diagram showing functional modules of a radio access network node according to an embodiment.

FIG. 11 schematically illustrates, in terms of a number of functional modules, the components of a radio access network node 300 according to an embodiment. The radio access network node 300 of FIG. 11 comprises a transmit module 310b configured to perform action S204. The radio access network node 300 of FIG. 11 may further comprise a number of optional functional modules, such as any of a receive module 310a configured to perform action S202, a receive module 310c configured to perform action S206, and a transmit module 310d configured to perform action S208. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any actions of the radio access network node 300 as disclosed herein.

The radio access network node 300 may be provided as a standalone device or as a part of at least one further device. For example, the radio access network node 300 may be provided in a node of the radio access network or in a node of the core network. Alternatively, functionality of the radio access network node 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the radio access network node 300 may be executed in a first device, and a second portion of the instructions performed by the radio access network node 300 may be executed in a second device; the herein disclosed embodiments are not limited to any particular number of devices on which the instructions performed by the radio access network node 300 may be executed. Hence, the methods according to the herein disclosed embodiments are suitable to be performed by a radio access network node 300 residing in a cloud computational environment. Therefore, although a single processing circuitry 310 is illustrated in FIG. 10 the processing circuitry 310 may be distributed among a plurality of devices, or nodes. The same applies to the functional modules 310a-310d of FIG. 11 and the computer program 1220b of FIG. 12.

Figure 12:
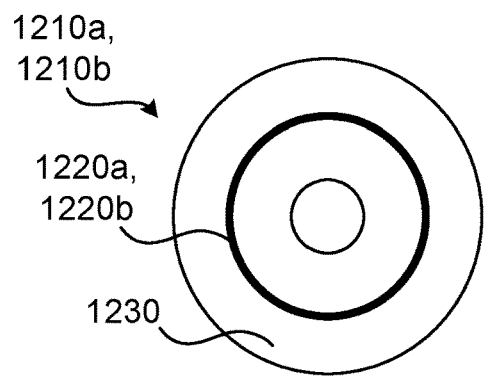
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any actions of the terminal device 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any actions of the radio access network node 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

Figure 13:
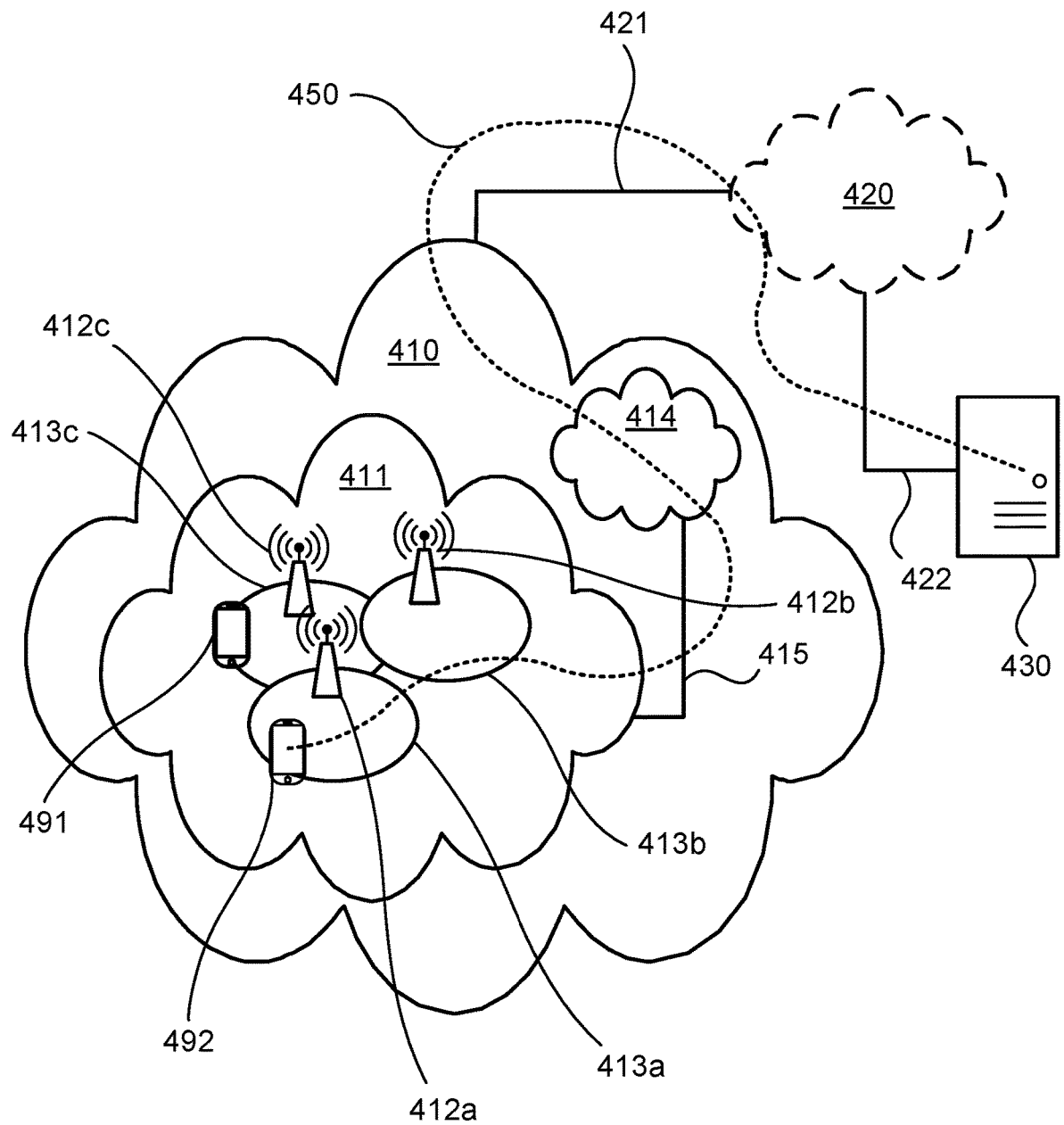
FIG. 13 is a schematic diagram illustrating a telecommunication network connected via an intermediate network to a host computer in accordance with some embodiments.

FIG. 13 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network no in FIG. 1, and core network 414, such as core network 120 in FIG. 1.

Access network 411 comprises a plurality of radio access network nodes 412a, 412b, 412c, such as NBs, eNBs, gNBs (each corresponding to the radio access network node 300 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 200 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 14:
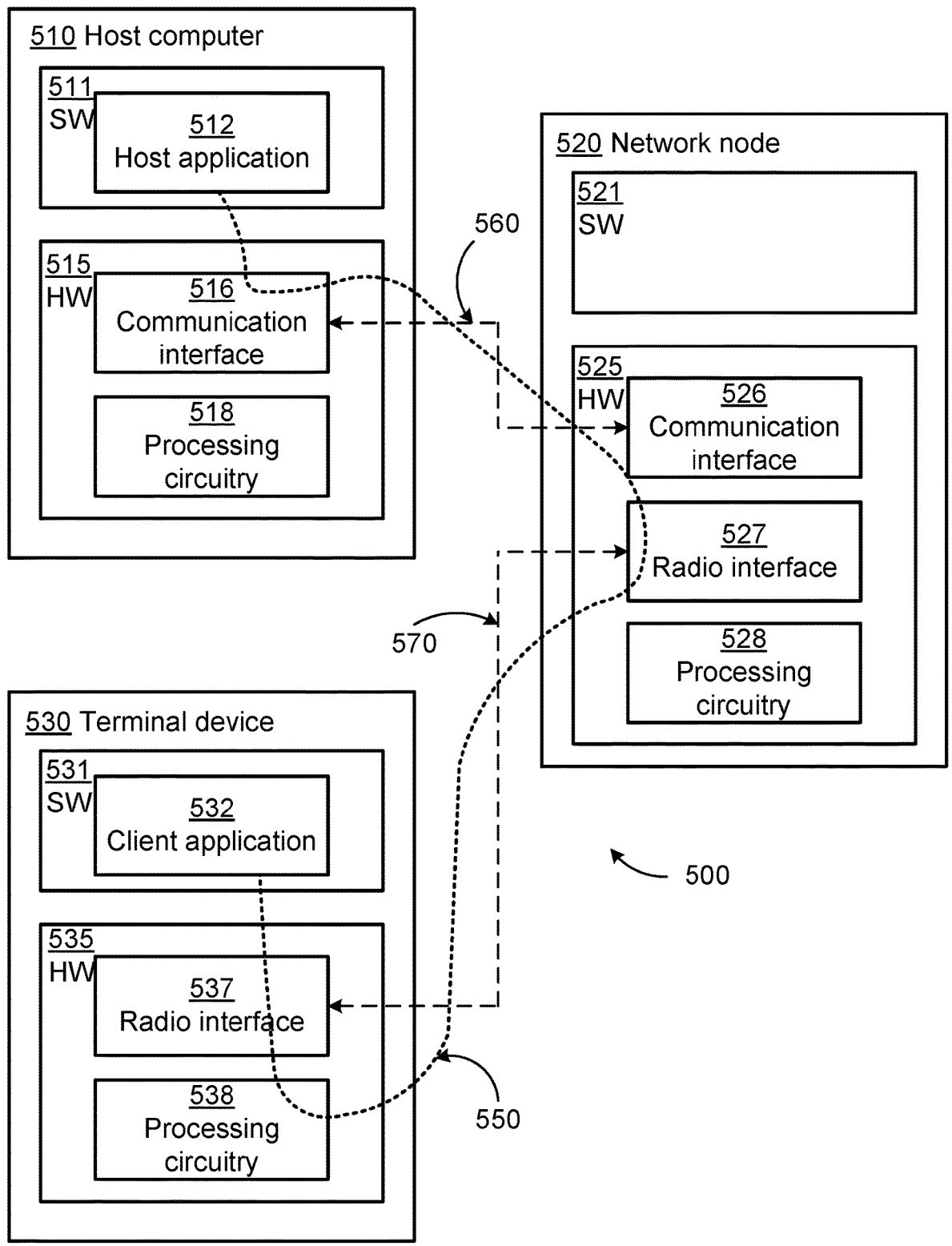
FIG. 14 is a schematic diagram illustrating host computer communicating via a radio base station with a terminal device over a partially wireless connection in accordance with some embodiments.

FIG. 14 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 200 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the radio access network node 300 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by radio access network node 520. Communication interface 526 may be configured to facilitate connection 560 to host computer 510. Connection 560 may be direct or it may pass through a core network (not shown in FIG. 14) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 14 may be similar or identical to host computer 430, one of network nodes 412a, 412b, 412c and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of reference signal resources from a terminal device, the method being performed by the terminal device, the terminal device comprising at least two antenna panels and a baseband chain operable to be switched between the at least two antenna panels, whereby the baseband chain is connected to each of the antenna panels one at a time, the method comprising:
- distributing a fixed set of reference signal resources among the at least two antenna panels by selecting which beams are to be used for transmission of the reference signal resources, wherein the reference signal resources are distributed among the at least two antenna panels according to antenna panel selection information; and
- transmitting each of the reference signal resources in a respective one of the beams as the baseband chain is connected to each antenna panel used for generating the beams.

2. The method according to claim 1, wherein a zero-power reference signal resource is transmitted during switching of the baseband chain from one of the antenna panels to another of the antenna panels.

3. The method according to claim 1, wherein no reference signal resource is transmitted during switching of the baseband chain from one of the antenna panels to another of the antenna panels.

4. The method according to claim 1, wherein the baseband chain is to be switched from one of the antenna panels to another of the antenna panels during a guard period.

5. The method according to claim 1, wherein, when the baseband chain does not need to be switched from one of the antenna panels to another of the antenna panels during the guard period, data is either received by the terminal device during the guard period or transmitted by the terminal device during the guard period.

6. The method according to claim 4, wherein the guard period timewise corresponds to one or two orthogonal frequency-division multiplexing, OFDM, symbols.

7. The method according to claim 1, further comprising:
- receiving, from a radio access network node providing network access for the terminal device, configuration information, the configuration information specifying how many reference signal resources to transmit and time slots in which the reference signal resources are to be transmitted.

8. The method according to claim 7, wherein the configuration information further specifies that the terminal device is allowed to transmit one or more zero-power reference signal resources.

9. The method according to claim 7, wherein the configuration information further specifies time slots for a guard period.

10. The method according to claim 1, further comprising:
- transmitting, to a radio access network node providing network access for the terminal device, at least part of the antenna panel selection information.

11. The method according to claim 1, wherein the terminal device comprises exactly two antenna panels or exactly three antenna panels.

12. The method according to claim 1, wherein the reference signal resources are transmitted in beams of at least two different beam widths.

13. A method for configuring a terminal device for transmission of reference signal resources, the method being performed by a radio access network node, the method comprising:
- transmitting, to the terminal device, configuration information, the configuration information specifying how many reference signal resources the terminal device is to transmit and time slots in which the reference signal resources are to be transmitted, wherein the configuration information is based on antenna panel selection information of the terminal device; and
- receiving, from the terminal device, at least part of the antenna panel selection information specifying how many antenna panels are connectable to each baseband chain at the terminal device.

14. The method according to claim 13, wherein the configuration information further specifies that the terminal device is allowed to transmit one or more zero-power reference signal resources.

15. The method according to claim 13, wherein the configuration information further specifies time slots for a guard period during which no reference signal resources are allowed to be transmitted.

16. The method according to claim 15, wherein the guard period timewise corresponds to one or two orthogonal frequency-division multiplexing, OFDM, symbols.

17. The method according to claim 13, wherein the antenna panel information further specifies how long switching of the baseband chain from one of the antenna panels to another of the antenna panels takes.

18. A terminal device for transmission of reference signal resources, the terminal device comprising at least two antenna panels and a baseband chain operable to be switched between the at least two antenna panels, whereby the baseband chain is connected to each of the antenna panels one at a time, the terminal device further comprising processing circuitry, the processing circuitry being configured to cause the terminal device to:
- distribute a fixed set of reference signal resources among the at least two antenna panels by selecting which beams are to be used for transmission of the reference signal resources, wherein the reference signal resources are distributed among the at least two antenna panels according to antenna panel selection information; and
- transmit each of the reference signal resources in a respective one of the beams as the baseband chain is connected to each antenna panel used for generating the beams.

19. A radio access network node for configuring a terminal device for transmission of reference signal resources, the radio access network node comprising processing circuitry, the processing circuitry being configured to cause the radio access network node to:
- transmit, to the terminal device, configuration information, the configuration information specifying how many reference signal resources the terminal device is to transmit and time slots in which the reference signal resources are to be transmitted, wherein the configuration information is based on antenna panel selection information of the terminal device, and
- receive, from the terminal device, at least part of the antenna panel selection information specifying how many antenna panels are connectable to each baseband chain at the terminal device.

20. A computer program product for transmission of reference signal resources from a terminal device, the computer program product comprising a non-transitory computer readable medium storing computer code which, when run on processing circuitry of the terminal device, the terminal device comprising at least two antenna panels and a baseband chain operable to be switched between the at least two antenna panels, whereby the baseband chain is connected to each of the antenna panels one at a time, the terminal device, causes the terminal device to:
- distribute a fixed set of reference signal resources among the at least two antenna panels by selecting which beams are to be used for transmission of the reference signal resources, wherein the reference signal resources are distributed among the at least two antenna panels according to antenna panel selection information; and transmit each of the reference signal resources in a respective one of the beams as the baseband chain is connected to each antenna panel used for generating the beams.

21. A computer program product for configuring a terminal device for transmission of reference signal resources, the computer program product comprising a non-transitory computer readable medium storing computer code which, when run on processing circuitry of a radio access network node, causes the radio access network node to:

transmit, to the terminal device, configuration information, the configuration information specifying how many reference signal resources the terminal device is to transmit and time slots in which the reference signal resources are to be transmitted, wherein the configuration information is based on antenna panel selection information of the terminal device, and receive, from the terminal device, at least part of the antenna panel selection information specifying how many antenna panels are connectable to each baseband chain at the terminal device.

* * * * *